G. WELLS & S. A. HAYNES.
MOP WRINGER.
No. 84,034. Patented Nov. 10, 1868.
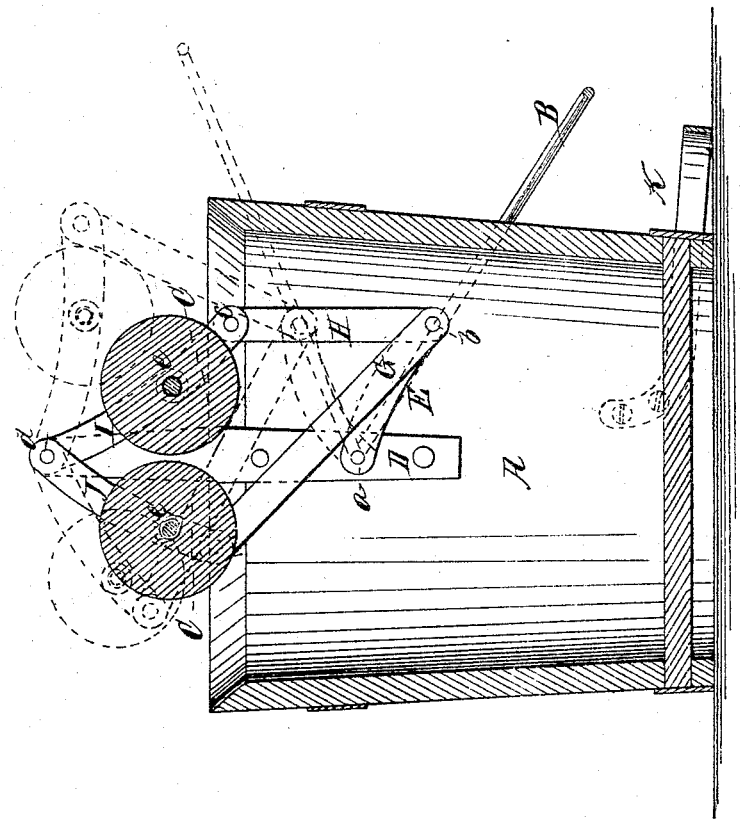
Witnesses.
Wm A Morgan
G C Cotton
Inventors.
Geo Wells
S A Haynes
per Munn & Co
Attorneys

GEORGE WELLS AND S. A. HAYNES, OF ISLAND POND, VERMONT.

Letters Patent No. 84,034, dated November 10, 1868.

IMPROVED MOP-WRINGER.

The Schedule referred to in these Letters Patent and making part of the same.

*To all whom it may concern:*

Be it known that we, GEORGE WELLS and S. A. HAYNES, of Island Pond, in the county of Essex, and State of Vermont, have invented a new and useful Improvement in Mop-Wringers; and we do hereby declare that the following is a full, clear, and exact description thereof, which will enable others skilled in the art to make and use the same, reference being had to the accompanying drawings, forming part of this specification, in which the drawing is a central section of a bucket, containing the wringing-mechanism.

The object of this invention is to provide a simple and convenient apparatus for wringing mops.

It consists of the arrangement of the bail with relation to the pail and mechanism for operating the rollers, as will be hereinafter more fully described.

To accomplish this, we employ a system of plates or rods, pivoted together, and to the ends, a, of the bail, which ends are turned in to form axes or trunnions, in which the bail is vibrated.

The ends a pass through the uprights D, which serve to support the rollers and their accessory mechanism, for, one end of each of the plates E being affixed to the ends a and the other end being pivoted to the plates G and H, at b, the plates E will be oscillated on the said ends a, when the handle B is moved.

The plates G and H are pivoted to the plates I and J, as shown at c. These latter plates are pivoted to each other at their upper ends, d, and to the uprights D, and afford the bearings for the ends of the axis-rods e e, passing through the rollers, as shown.

By this construction, the rollers will be made to recede from each other when the handle B is raised, or to approach each other when it is lowered, by means of the divergence or approximation of the bearing-plates.

One of the rollers is provided with a crank-handle to turn the rollers when brought together against the mop.

K is a foot-band to hold the pail steady when turning the crank-handle.

The red outline shows the position of the rollers and accessory mechanism when raised for inserting the mop.

The plates and uprights may be arranged to operate on the outside of the pail, if desired, although the arrangement shown is more compact.

It is well known that the rollers have been operated by a bail, and also by a toggle-joint, but these, separately considered, form no part of our invention, and we do not therefore claim them.

Having thus described our invention,

We claim as new, and desire to secure by Letters Patent—

The bail B, arranged with relation to the pail A, uprights D, plates E, G, H, I, J, and rollers C C, as herein described, and operating in the manner and for the purpose specified.

GEORGE WELLS.
S. A. HAYNES.

Witnesses:
WM. MASON,
D. M. WESCOTT.